Figures 1, 2:
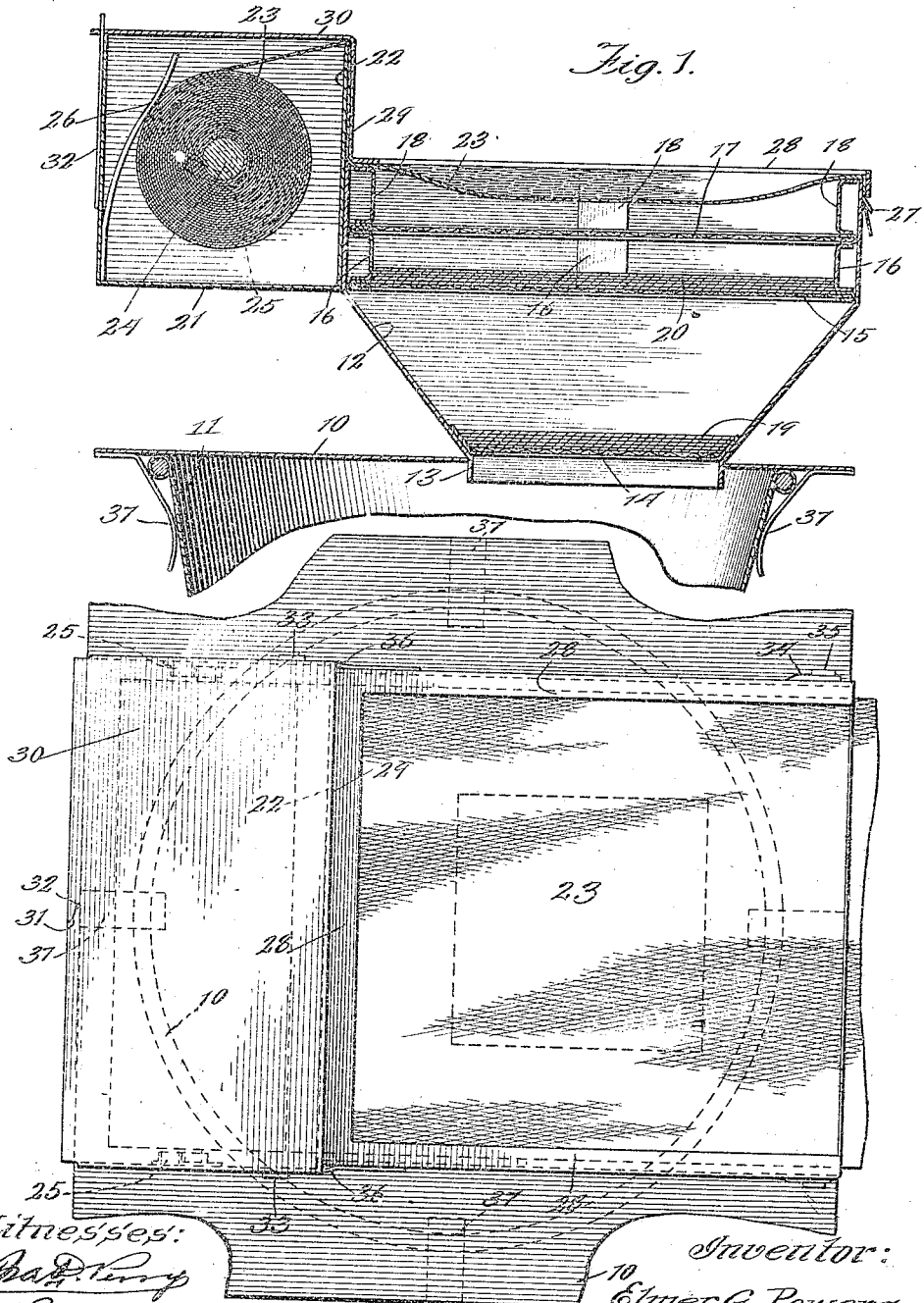

E. G. POWERS.
ATTACHMENT FOR MILKING PAILS.
APPLICATION FILED NOV. 4, 1914.

1,140,528.

Patented May 25, 1915.
2 SHEETS—SHEET 1.

Witnesses:

Inventor:
Elmer G. Powers
By Wilfred C. Lane
atty.

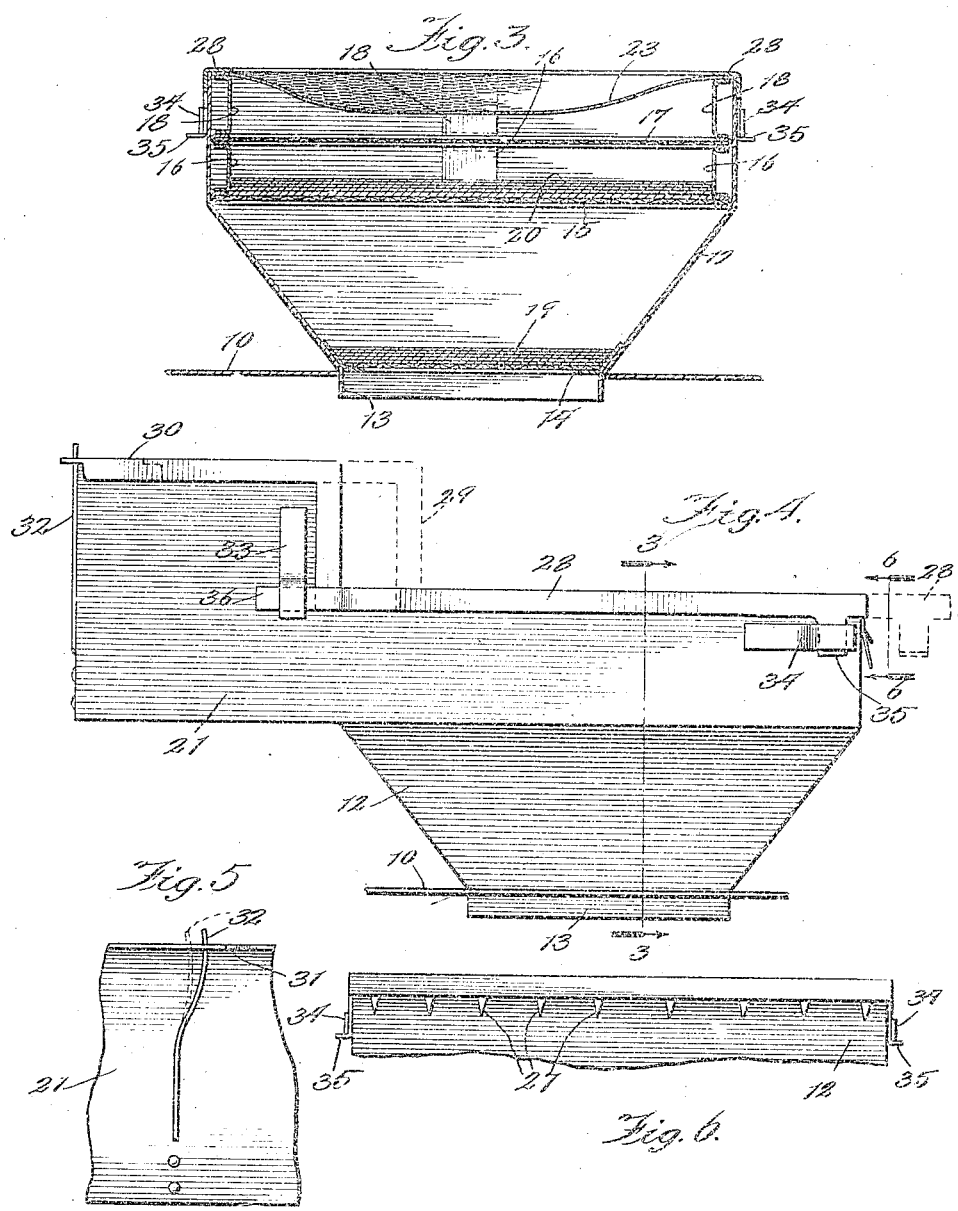

UNITED STATES PATENT OFFICE.

ELMER G. POWERS, OF OGDEN, IOWA.

ATTACHMENT FOR MILKING-PAILS.

1,140,528.  Specification of Letters Patent.  Patented May 25, 1915.

Application filed November 4, 1914. Serial No. 870,194.

*To all whom it may concern:*

Be it known that I, ELMER G. POWERS, a citizen of the United States, residing at Ogden, in the county of Boone and State of Iowa, have invented certain new and useful Improvements in Attachments for Milking-Pails, of which the following is a specification.

This invention relates to improvements in attachments for milking pails and one of the objects of the same is to provide an improved device of this character adapted to be attached to the lid or cover of a milking pail for the purpose of preventing impurities from entering the pail.

A further object is to provide an improved device of this character embodying a flexible screening element, a supply of which is adapted to be held in a container and to be drawn from the container across the receptacle and secured in such position, and after use, the portion which has been used may be readily detached from the remaining portion to permit a new portion to be placed in position.

A further object is to provide an improved device of this character, which will be simple, durable and cheap in construction and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating the invention and in which—

Figure 1 is a vertical longitudinal sectional view of an improved device of this character constructed in accordance with the principles of this invention. Fig. 2 is a top plan view of the parts shown in Fig. 1. Fig. 3 is a vertical sectional view taken on line 3—3, Fig. 4. Fig. 4 is a side elevation of the attachment, and showing the gauze clamp or retainer in dotted lines, in an adjusted position. Fig. 5 is a detail view of the fastening device for the cover of the container and the gauze clamp. Fig. 6 is a detail elevation taken on line 6—6 Fig. 4.

Referring more particularly to the drawings and in the present exemplification of this invention, the numeral 10 designates the cover of the milking pail 11. This cover is provided with an aperture therethrough, and supported by the cover is a receiver 12, the bottom portion of which is preferably tapered or conical as shown, and open, and the receiver is supported in such a manner that the open bottom thereof will register with the opening in the cover 10. If desired a flange 13 may be provided which depends below the lower face of the cover and surrounds the opening therein, so as to direct the milk into the pail. Arranged within the bottom of the receiver and preferably adjacent the opening thereof is a screen 14 which may be constructed of any suitable reticulated material, and this screen is removably supported in any position in any desired or suitable manner. A second screen 15 is also removably supported in the receiver and is spaced above the first screen 14, and extending above the screen 15 are uprights 16 upon which a third screen 17 is supported, and these uprights 16 may be of any desired height. Similar uprights 18 project above the screen 17, and these latter uprights terminate preferably substantially flush with the upper edge of the receiver 12. All of these screens are removably supported in position and may be of any desired or suitable mesh. If desired filtering material 19 may be placed upon the screen 14 and filtering material 20 may be placed upon the screen 15 between the latter and the screen 17 so that the milk may be filtered upon its passage through the filtering material and through the screens.

Supported by one of the walls of the receiver 12 is a container 21, one side 22 of which is adjacent the receiver and preferably projects some distance above the top of the receiver. A supply of flexible screening material 23 is arranged within the container 21 and this material is wound upon a core 24, the ends of which core are removably supported in suitable bearings 25. An elastic member 26, preferably in the form of a leaf spring is arranged within the container so as to bear upon the roll of screening material 23 to hold the same taut.

The flexible screening material 23 is drawn from the container preferably over the top of the edge of the wall 22, and then down the side of the wall to the top of the receiver 12 and then across the top of the receiver so as to rest upon the tops of the uprights 18 and then over the edge of the receiver 12 opposite the container 21 so as to engage the fastening device 27 preferably in the form of teeth or pins so as to hold the free end of the screening material in position.

A clamping element designated generally by the reference numeral 28 for holding the edges of the flexible screening material 23, preferably comprises a frame constructed of L-shaped pieces adapted to engage the upper edges of the receiver 12 and to project thereover, so as to coöperate with the tops of the uprights 18 on the screen 17 and clamp the screening material between these uprights and the clamping frame. This clamping element 28 is also provided with an upright portion 29, of a size and configuration to conform to the portion of the wall 22 of the container 21 which projects above the top of the receiver 12, to hold the portion of the flexible screening element which passes down the outside of the wall 22 in position. A cover 30 may be connected with the upright portion 29, so that when the clamping element and the upright 29 are in position, the cover will extend over and close the container 21. The free edge of the cover 30 may be provided with a slot 31 (see Fig. 2), into which an elastic fastening device such as the spring 32 secured to the container 21, is adapted to pass to hold the cover and the clamp against displacement.

Additional fastening devices may be provided for the clamping element, such as the clips 33, 34, one clip 33 being secured preferably on opposite sides of the container 21 while one clip 34 is secured on opposite sides of the receiver 12, preferably adjacent the top thereof and into which latter clips, projections 35 carried by the clamping element 28 are adapted to pass, while projections 36 also carried by the clamping element 28 are adapted to coöperate with the clips 33. Thus it will be manifest that when the fastening device 32 is adjusted to release the cover 30 of the container, the clamping element 28, the upright portion 29 and the cover 30 may be readily removed by sliding the clamping device 28 forwardly. Similarly the clamping device and the cover 30 may be as readily placed in position and secured against adjustment. Obviously the cover 30 and the upright 29 may be constructed separately from the clamping element 28, or separately from each other.

In use the screening element 23 is drawn from the container across the receiver and the forward end thereof secured as described. The clamping element 28 is then placed in position and as the milk enters the receiver it will pass through the various screening elements and into the pail. After use the clamp 28 may be removed or loosened, and the portion of the screening element which has been used may be readily severed, and a new portion placed in position.

Any suitable means may be provided for holding the cover on the pail, and for this purpose, there is herein shown a series of springs 37 which are attached to the cover 10 and engage the outside of the pail.

With this improved construction it will be noted that the container 21 with the supply of screening material is so arranged with respect to the receiver 12, that during the milking operation, the container 21 may be placed in a position away from the operator where it will be out of the way.

While the preferred form of the invention has been herein shown and described, it is to be understood that various changes may be made in the details of construction, and in the combination and arrangement of the several parts without departing from the spirit of the invention.

What is claimed as new is:

1. An attachment for milking pails, embodying an open bottom receiver, a container arranged at one side of the receiver, a supply of flexible screening disposed within the container, a screen removably supported within the receiver, supports projecting above the screen, said screening adapted to be drawn from the container and across the receiver to rest upon the supports, and clamping means coöperating with the supports for holding the screening in position.

2. An attachment for milking pails, embodying an open bottom receiver, a container arranged at one side of the receiver, a supply of flexible screening disposed within the container, a screen removably supported within the receiver, supports projecting above the screen, said screening adapted to be drawn from the container and across the receiver to rest upon the supports, clamping means coöperating with the supports for holding the screening in position, and a cover for the container, said clamping means connected to and removable with the cover.

3. An attachment for milking pails, embodying an open bottom receiver, a container supported thereby, one edge of the container adjacent to and projecting above the inlet of the receiver, a supply of flexible screening disposed within the container, said screening adapted to be drawn from the container over said edge and down to and across the inlet of the receiver, means for securing the free end of said screening, a removable screen within the receiver, supports projecting from the screen and upon which the flexible screening rests, and a clamping device coöperating with the said supports for holding the screening in position.

4. An attachment for milking pails, embodying an open bottom receiver, a container, a supply of flexible screening in the container, and adapted to be drawn therefrom and across the inlet of the receiver, means for securing the free end of the screening, a removable clamping device for securing the edges of screening, and a cover for the container, connected with the clamping device and removable therewith.

5. An attachment for milking pails, embodying an open bottom receiver, a container, a supply of flexible screening in the container, and adapted to be drawn therefrom and across the inlet of the receiver, means for securing the free end of the screening, a removable clamping device securing the edges of the screening, a cover for the container connected with the clamping device and removable therewith, clips on the receiver, and projections on the clamping device and coöperating with the clips for removably holding the clamp in position.

6. An attachment for milking pails, embodying an apertured cover for the pail, means detachably securing the cover in position, a receiver supported by the cover and having an open bottom communication with the aperture in the cover, a container, a supply of flexible screening in the container, and adapted to be drawn therefrom and across the inlet of the receiver, means for detachably securing the free end of the said screening, a clamp device separated from the said means encompassing the inlet of the receiver for holding the edges of the screening in position, and a cover for the container connected with the clamping device and removable therewith.

7. An attachment for milking pails, embodying an apertured cover for the pail, means detachably securing the cover in position, a receiver supported by the cover and having an open bottom communication with the aperture in the cover, a container, a supply of flexible screening in the container, and adapted to be drawn therefrom and across the inlet of the receiver, means for detachably securing the free end of the said screening, and a clamping device for holding the edges of the screening in position, a portion of the container adjacent the receiver extending above the inlet of the latter and adjacent which portion the screening extends, and a portion of the said clamping device coöperating with said portion of the container.

In witness whereof, I hereunto subscribe my name to this specification in the presence of two witnesses.

ELMER G. POWERS.

Witnesses:
   FRANK H. RITTER,
   MINNIE W. POWERS.